US007011399B2

(12) United States Patent
Godil et al.

(10) Patent No.: US 7,011,399 B2
(45) Date of Patent: Mar. 14, 2006

(54) LOW THERMAL MASS, VARIABLE WATT DENSITY FORMABLE HEATERS FOR PRINTER APPLICATIONS

(75) Inventors: Amin M. Godil, Vancouver, WA (US); Larry E. Hindman, Woodbrun, OR (US)

(73) Assignee: Xerox Corporation, Stamford, CT (US)

( * ) Notice: Subject to any disclaimer, the term of this patent is extended or adjusted under 35 U.S.C. 154(b) by 265 days.

(21) Appl. No.: 10/751,626

(22) Filed: Jan. 5, 2004

(65) Prior Publication Data

US 2005/0146584 A1 Jul. 7, 2005

(51) Int. Cl.
*B41J 2/175* (2006.01)
*G01D 11/00* (2006.01)

(52) U.S. Cl. .......................................... 347/88; 347/99

(58) Field of Classification Search .................. 347/85, 347/88, 99

See application file for complete search history.

(56) References Cited

U.S. PATENT DOCUMENTS

| | | | | |
|---|---|---|---|---|
| 5,635,964 | A * | 6/1997 | Burr et al. | 347/17 |
| 6,086,194 | A * | 7/2000 | Ikezaki | 347/88 |
| 6,530,655 | B1 * | 3/2003 | Jones et al. | 347/88 |
| 6,905,201 | B1 * | 6/2005 | Leighton | 347/88 |

* cited by examiner

*Primary Examiner*—Anh T. N. Vo
(74) *Attorney, Agent, or Firm*—Fay, Sharpe, Fagan, Minnich & McKee, LLP

(57) ABSTRACT

An ink melt heater is disposed in a phasing printing system for heating a solid ink stick for melting the ink stick from a solid to a liquid phase. The heater includes a trace assembly having a plurality of power zones having different wattage densities respectively. The heat transfer plate is adhered to the trace assembly for mating engagement against the solid ink stick. The heater has a low thermal mass for enhanced and rapid heat transfer from the trace assembly through the transfer to the ink stick.

11 Claims, 3 Drawing Sheets

LOW THERMAL MASS, VARIABLE WATT DENSITY FORMABLE HEATERS FOR PRINTER APPLICATIONS

BACKGROUND

The present exemplary embodiments relate to printing systems and, in particular, printing devices which utilize a supply of color inks to be communicated to a print head for document printing. More particularly, the present embodiments utilize solid ink sticks as a supply ink, which must be heated to a liquid form before being capable of communication to the print head. Such systems are commercially available under the PHASOR® mark from Xerox Corporation.

The present embodiments concern the structure of the heater element that melts the solid ink stick to a liquid form.

The basic operation of such phasing printing systems comprises the melting of a solid ink stick, its communication to a reservoir for interim storage, and then a supply process from the reservoir to a print head for printing of a document. In the melting of the ink stick, a relatively large amount of thermal energy is needed to be applied in a very small area. Accordingly, the heating element itself needs a relatively high watt density for the efficient communication of the thermal energy to the ink stick. Any heater supporting structure for the heating elements will operate as an intermediate heat sink. The lower the mass of the support structure, the more efficient the communication of thermal energy there through. In addition, since the heating element must not only melt the ink stick, but assist in the melted ink's communication to the reservoir, the heater element needs to be formable, i.e., mechanically contourable to a shape to facilitate the supply of the melted ink to the reservoir, and such forming needs to be accomplished without large interface strain within the heater element assembly that could damage the heater element-to-support plate adhesion. Two thermal heaters zones are required in the heater assembly—one to regulate the ink melt rate of the solid ink stick and another higher temperature zone to reduce the ink viscosity for better fluid communication to the reservoir and improve ink filter efficiency. Efficient construction of a variable waft density heating assembly with a simple energy supply system is another need to be satisfied of the desired heating element assembly. Lastly, the solid ink stick needs to be mechanically secured to the heater to prevent ink detachment during shipping and to prevent the creation of pieces of solid ink particles which can cause marking of exterior surfaces of the printer. This last feature prevents the ink stick from breaking free from the heater plate, resulting in the creation of a large number of shards and ink particles that can then cosmetically mark the surfaces of the printer or potentially jam internal printer mechanisms.

The present exemplary embodiments satisfy these needs as well as others to provide a low thermal mass, variable watt density formable heater for a phasing printer application. However, it is to be appreciated that the present exemplary embodiments are also amendable to other like applications where the heating element construction requires a high waft density heater in a relatively small area.

BRIEF DESCRIPTION

An ink melt heater is provided for heating a solid ink stick for melting a heat stick from a solid to a liquid phase wherein the heater includes a plurality of power zones having different wattage densities respectively. The heater includes a heat transfer plate adhered to the trace assembly for mating engagement against the solid ink stick. The heater has a low thermal mass for enhancing rapid heat transfer from the trace assembly through the transfer plate to the ink stick. The heater has a formable construction for forming the heater into a non-planar configuration with an interface strain between the plate and trace assembly less than an amount that can damage the trace-to-plate adhesion. The plurality of power zones comprise a melt zone having a first trace assembly for melting the solid ink stick at a first preselected temperature, and a post-melt zone having a second trace assembly for raising the first preselected temperature of the melted ink to a second preselected temperature conducive to ink runoff of the liquid ink. A protrusion depends from the heat transfer plate and is disposed for engagement against the solid ink stick to form a mechanical lock of the ink stick to the heater.

DETAILED DESCRIPTION

Figure 1:
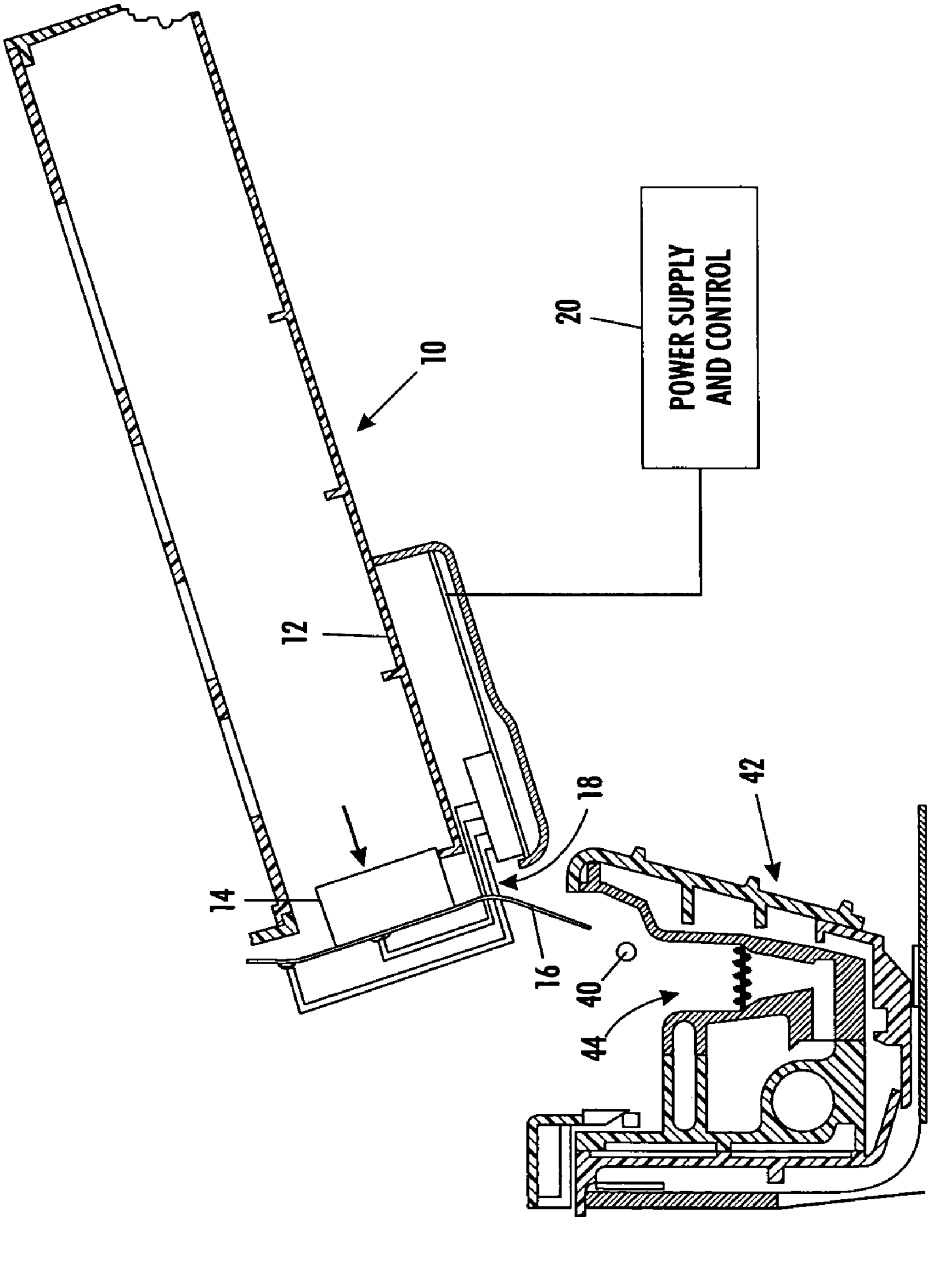
FIG. 1 is a cross-sectional view and partial section of a print head, ink stick and ink loader assembly, and power supply and control system therefor.

With reference to FIG. 1, the basic elements of an ink supply system in an ink "phase-changing" printing system can be seen. Ink loader assembly 10 includes a tray 12 for holding a solid phase ink stick 14. An ink melt heater 16 is disposed at an open end 18 of the tray to contact the ink stick and to allow for egress of liquid phase ink during heating from the tray 10. The heating plate 16 receives its heating energy from a power supply and control system 20. The heating element includes an assembly with resistance traces thereon so that electrical energy supplied thereto can be converted to heat energy.

FIG. 1 shows an ink drip 40 falling from the tray 10 at ink drip point 70 and the heating element 16 assembly into a print head assembly 42. Print head assembly 42 comprises a reservoir 44 to receive the melted ink and to communicate the ink to nozzles (not shown) within the print head assembly for printing on a document. It should be appreciated with reference to FIG. 1 that the ink stick 14 is intended to engage the heat plate 16 as it is shown therein by being urged against the plate by gravity or a spring biased member (not shown) to enhance its contact between the stick 14 and the plate 16.

Figure 2:
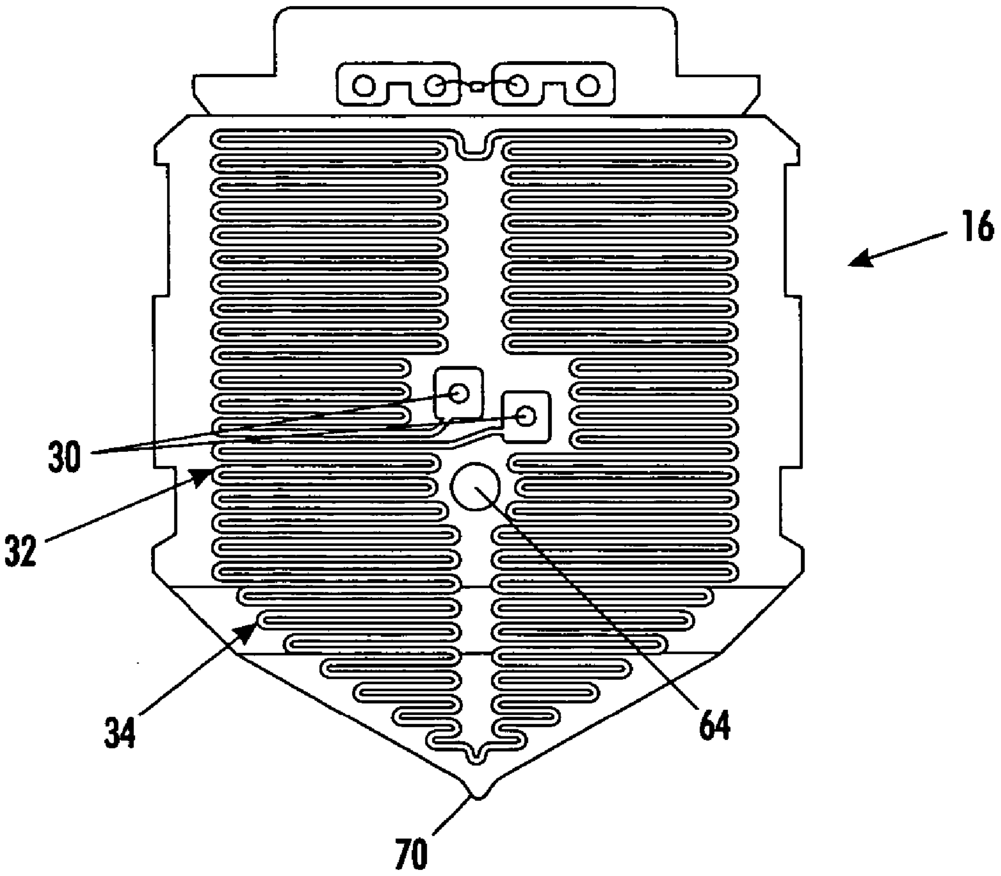
FIG. 2 is an end view of one embodiment of a heater melt plate.

With reference to FIG. 2, power pads 30 connect wires (not shown) from the power supply to the heater plate 16. Plate 16 includes two thermal heater zones comprising an ink melt zone 32 and a liquid ink heat zone 34. The ink melt zone 32 is intended to operate at about 100° C. when in heating contact with an ink stick and includes an assembly of resistive heating traces configured and disposed to achieve such a preselected temperature. The traces comprise a serpentine arrangement of a resistive material known for generating thermal energy from electric supply. INCOL® is preferably employed. The waft density in the ink melt zone is approximately 50 watts per square inch during the heating operation. A variable wattage distribution is included in each heater zone that is controlled by the heater trace design. In the middle of the first heater zone there is a deliberately created low wattage area to improve the ink flow during short heater duty cycles.

The liquid ink heat zone 34 allows the melted ink to run off and along its contour into the reservoir as is shown in FIG. 1. In this post melting heat zone, the ink is intended to be heated to a temperature of approximately 140° C., but this higher temperature can be effectively reached with a lower watt density due to the noncontact of this portion of heater with the solid ink stick. Accordingly, the heat traces in the post-melt heat zone are configured to generate approximately 25 watts per square inch (W/in$^2$) during the heating operation. In the preferred embodiment, the heat traces in the melt zone and in the post-melt zone are connected in series and the waft density is adjusted by varying the spacing of the traces, i.e., the traces in the post-melt heat zone are spaced farther apart than those in the ink melt heat zone, thereby adjusting the watt density per inch squared.

The heating element can reach relatively high temperatures (approximately 200° C.) during the melting process, for example, if there is no ink stick contact with the heater assembly, such as may occur in an ink stick jam, so the heater construction comprises high operating temperature adhesives and polymers.

Figure 3:
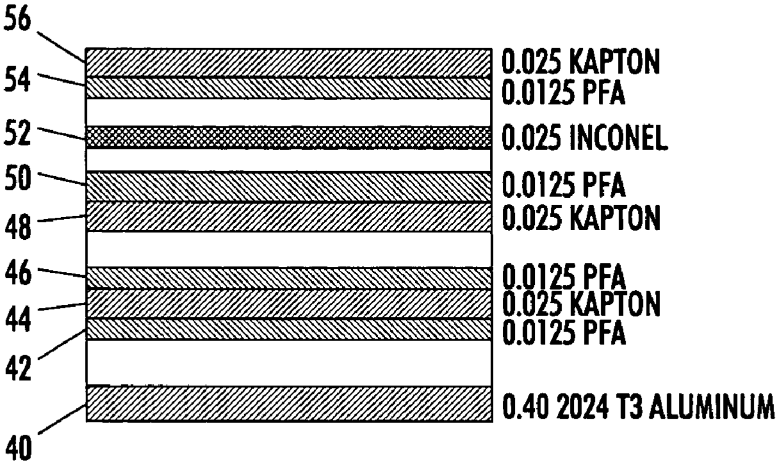
FIG. 3 is an expanded cross-sectional stack up of one embodiment of heater material lay up.

With particular reference to FIG. 3, an exploded cross-section of the heater element is shown for illustrating the materials stack up. Because of the melt and "freeze on demand" requirements of the heater element (i.e., when the heater is not operating, it is desired to cool very quickly so that the ink stick may similarly cool when not being melted) a minimal thickness of aluminum sheet material (0.4 mm) 40 is used to provide the heat transfer mating surface for the ink melting, and to provide handling rigidity. Additionally, the thin sheet metal 40 allows for forming and bending to a non-planar shape the heater 16 without large interface strain that could damage the trace assembly to plate 40 adhesion. A first KAPTON® layer 44 and a second KAPTON layer 48 are adhered to the plate 40 with layers of PFA adhesive 42, 46. KAPTON is an insulator. The heating traces 52 comprising INCONEL are adhered to the assembly with adhesive layers 48, 54 and sealed with an insulating layer of KAPTON 56.

To keep the heater 16 from self-destruction during the startup temperature ramp (10° C./sec–20° C./sec) the layer of aluminum 40 provides a direct highly conductive path for the heater traces 52 to discharge their thermal energy. The rapid transfer of energy keeps the trace temperatures lower, thus creating lower thermal stresses with reduced chances of thermal buckling of the heater traces 52 that can cause interlayer delamination. Lower trace temperatures also enhance the life of the polymers, PFA, KAPTON, used in the heater construction. As noted above, the aluminum layer also allows a high watt density of 25 W/in$^2$–50 W/in$^2$ or higher operation.

To keep the heater-to-heater variability low, as few as possible layers of insulation or aluminum are used to separate the ink stick from the heater traces 52. To reduce process variability, automated manufacturing processes were selected so that a number of heater assemblies can be co-cured together in a controlled press and then punched and formed at the same time in one operation. Such process keeps the cost and between part-to-part variability low.

Figure 4:
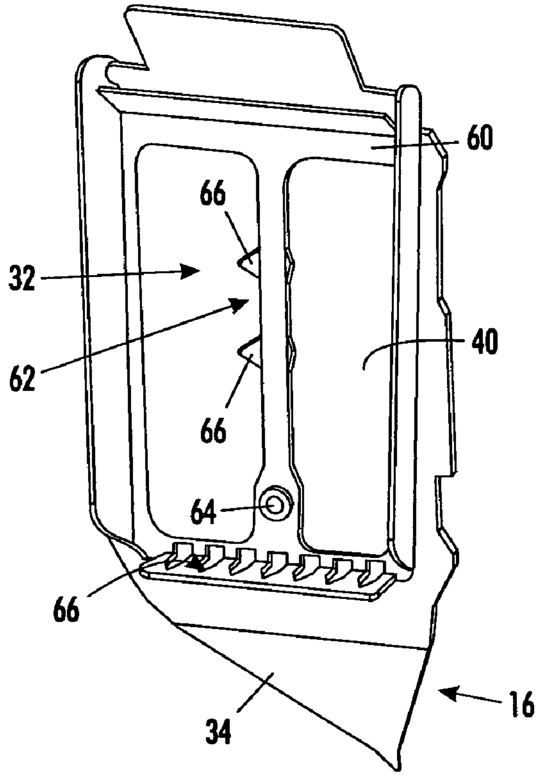
FIG. 4 is an elevated view of the heater assembly showing the opposite side from FIG. 2.

With particular reference to FIGS. 2 and 4, as noted above, a two-zone heater meets the dual performance requirements of a melt zone 32 for melting the ink and a post-melt zone 34 for raising the ink to the desired temperature prior to the ink dripping into the print head assembly. For minimizing costs, the traces 52 in both of these zones are connected in series and controlled by a single control circuit 20. When the ink stick is not present against the assembly 16, the melt plate temperature is controlled and limited by a thermistor (not shown) attached to the heater plate to avoid overheating. When an ink stick is presented to the upper melt zone 32, the thermal load, supplied by the ink stick draws down the heater plate temperature in the zone occupied by the ink. The post-melting zone 34 does not receive a heavy thermal load; this allows the temperature of this zone to remain relatively unaffected or climb as more power is applied. The relative ratios of power between the zones determines the ink exit temperature and melt rate.

FIG. 4 illustrates the side of the heater assembly intended to contact the ink stick. A rigid metallic frame 60, preferably also aluminum although other materials could certainly be used, includes a single narrow strip 62 in the middle of the melt zone 32 including protrusions 66 that embed into the partially melted ink stick 14 and provides the mechanical lock to keep the ink stick 14 from separating from the heater assembly 16. This embedding feature is needed to prevent the ink stick 14 from breaking free from the heater plate 40, resulting in the creation of a large number of shards and ink particles that can then mark the cosmetic surfaces of the printer or potentially jam internal printer mechanisms. The width of the aluminum strip 62 has to be as narrow as possible without compromising its design intent to reduce an undesirable variable thermal resistance between the heater assembly 16 and the ink stick 14. The frame 60 is attached to the heater assembly by a single rivet 64. A depending screen portion 66 comprises a lower part of the frame 60 to catch solid portions of the ink stick that may break off and to screen the liquid ink as it flows down towards the print head.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An ink melt heater for heating a solid ink stick for melting the ink stick to a liquid, the heater comprising:

a heater trace assembly including a plurality of heater traces for converting a supply of electrical energy to discharging thermal energy, the plurality of heater traces being disposed to form at least a first and a second thermal heater zones, the first thermal heater zone having a first trace configuration for regulating an ink melt rate, and the second thermal heater zone having a second trace configuration for reducing liquid phase ink viscosity; and, a support plate adhered to the trace assembly on a first side and including an ink stick contacting surface on a second side.

2. The ink melt heater as claimed in claim 1 wherein the heater operates in a watt density ranging from at least twenty-five to fifty watts per square inch.

3. The ink melt heater as claimed in claim 1 wherein the first and second trace assemblies are connected in series and connected by a common control circuit.

4. The ink melt heater as claimed in claim 1 including a protrusion depending from the heat transfer plate disposed for engagement against the solid ink stick to form a mechanical lock of the stick to the heater.

5. The ink melt heater as claimed in claim 4 wherein the protrusion comprises a frame disposed about an end of the ink stick and fastened to the heat transfer plate.

6. An ink melt heater for heating a solid ink stick for melting the ink stick from a solid to a liquid phase, the heater includes a trace assembly having a plurality of power zones having different wattage densities respectively and, adhered thereto, a heat transfer plate for mating engagement against the solid ink stick, the heater having a low thermal mass for enhanced and rapid heat transfer from the trace assembly through the transfer plate to the ink stick, and a formable construction for forming the heater into a non-planar configuration with an interface strain between the plate and the trace assembly less than an amount that could damage the trace-to-plate adhesion.

7. The ink melt heater as claimed in claim 6 wherein the heater operates in a watt density ranging from at least twenty-five to fifty watts per square inch.

8. The ink melt heater as claimed in claim 6 wherein the plurality of power zones comprises a melt zone having a first trace assembly for melting the solid ink stick at a first preselected temperature, and a post melt zone having a second trace assembly for raising the first preselected temperature of the melted ink to a second preselected temperature conducive to ink run off of the heater.

9. The ink melt heater as claimed in claim 8 wherein the first and second trace assemblies are connected in series and connected by a common control circuit.

10. The ink melt heater as claimed in claim 6 including a protrusion depending from the heat transfer plate disposed for engagement against the solid ink stick to form a mechanical lock of the stick to the heater.

11. The ink melt heater as claimed in claim 10 wherein the protrusion comprises a frame disposed about an end of the ink stick and fastened to the heat transfer plate.

* * * * *